(12) United States Patent
Iraschko et al.

(10) Patent No.: US 8,469,160 B2
(45) Date of Patent: Jun. 25, 2013

(54) DISC BRAKE ADJUSTMENT DEVICE HAVING A BLOCKING DEVICE

(75) Inventors: Johann Iraschko, Schweitenkirchen (DE); Georg Kempinger, Eching (DE); Florian Orgler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 172 days.

(21) Appl. No.: 13/016,078

(22) Filed: Jan. 28, 2011

(65) Prior Publication Data
US 2011/0203885 A1 Aug. 25, 2011

Related U.S. Application Data

(63) Continuation of application No. PCT/EP2009/005408, filed on Jul. 27, 2009.

(30) Foreign Application Priority Data

Jul. 30, 2008 (DE) .......................... 10 2008 035 370

(51) Int. Cl.
*F16D 65/14* (2006.01)

(52) U.S. Cl.
USPC .................................. 188/196 BA; 188/71.9

(58) Field of Classification Search
USPC ............. 188/196 BA, 196 V, 202, 71.7, 71.8, 188/71.9
See application file for complete search history.

(56) References Cited

U.S. PATENT DOCUMENTS

| 4,441,591 A * | 4/1984 | Severinsson et al. ......... 188/202 |
| 6,213,255 B1 * | 4/2001 | Neuwirth ...................... 188/71.9 |
| 2005/0034935 A1 * | 2/2005 | Maehara ...................... 188/71.9 |

OTHER PUBLICATIONS

International Search Report dated Sep. 25, 2009 including English-language translation (Four (4) pages).

* cited by examiner

*Primary Examiner* — Melanie Torres Williams
(74) *Attorney, Agent, or Firm* — Crowell & Moring LLP

(57) ABSTRACT

A wear adjustor is provided for adjusting the wear of brake pads and the brake disc of a pneumatically operated disc brake having a brake application device that can be actuated via a rotary lever. The wear adjustor is able to be inserted into an adjusting spindle of the brake application device. The wear adjustor includes a clutch ring for coupling to a spring sleeve that is in engagement with the adjusting spindle. A blocking device is disposed between the adjusting spindle and the wear adjustor. The blocking device forms a stop for the adjusting spindle in the tangential direction relative to the rotating direction.

19 Claims, 8 Drawing Sheets

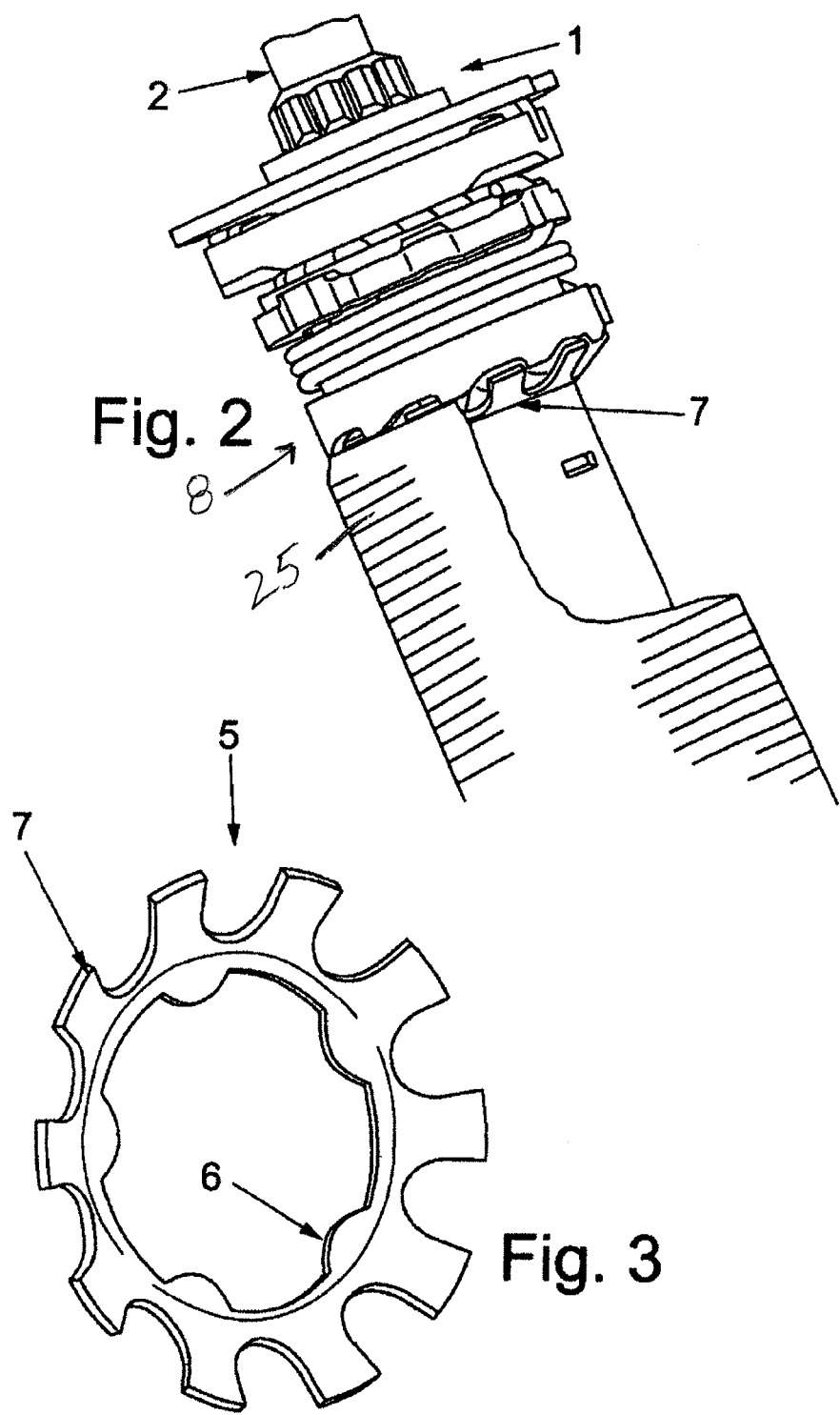

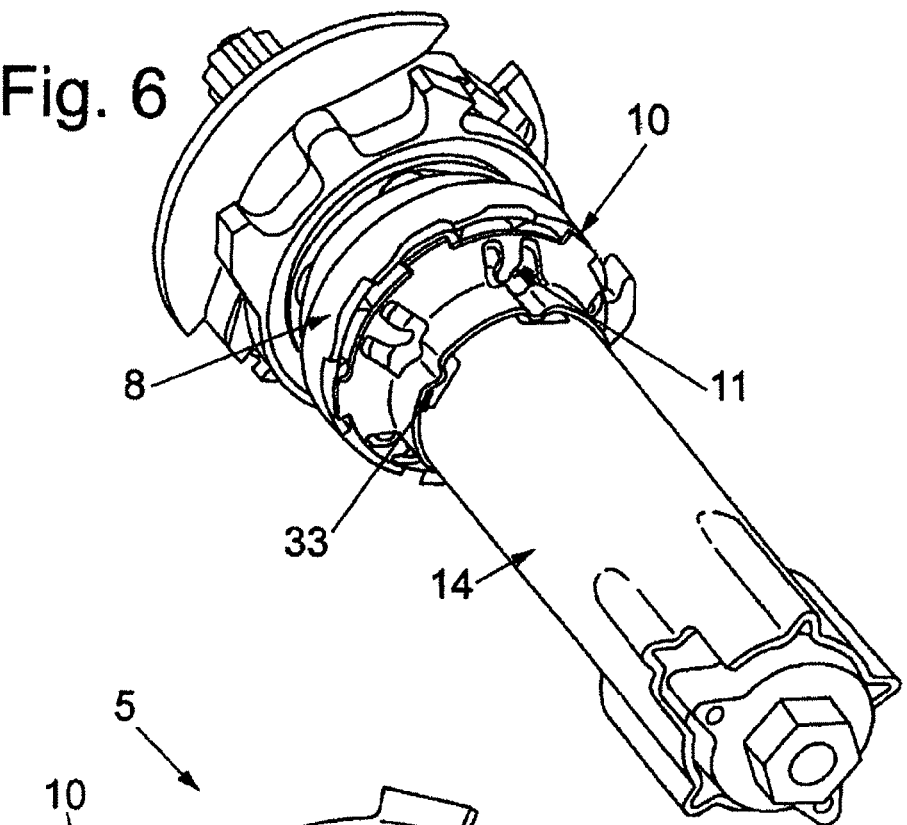
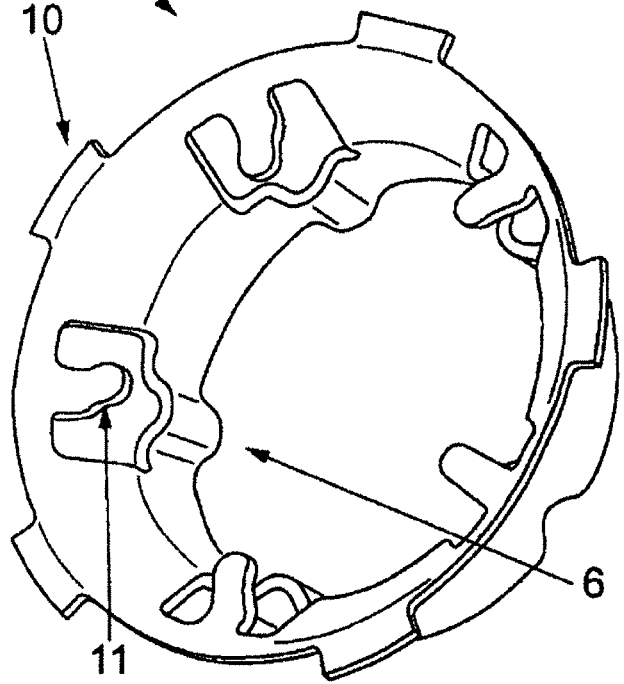

DISC BRAKE ADJUSTMENT DEVICE HAVING A BLOCKING DEVICE

CROSS-REFERENCE TO RELATED APPLICATIONS

This application is a continuation of PCT International Application No. PCT/EP2009/005408, filed Jul. 27, 2009, which claims priority under 35 U.S.C. §119 from German Patent Application No. DE 10 2008 035 370.1, filed Jul. 30, 2008, the entire disclosures of which are herein expressly incorporated by reference.

This application contains subject matter related to U.S. Application Ser. Nos. 13/015,974, 13/015,954, 13/016,418, and 13/015,930, entitled "Disc Brake Adjusting Device Having an Output Side Coupling Ring with a Defined Working Rotational Axis," "Disc Brake Adjusting Device Having a Cone Clutch Utilizing Clamping Balls," "Method for Fixing an Adjustment Device on a Disc Brake," and "Disc Brake Adjusting Device with a Torque Dependent Coupling" filed on even date herewith.

BACKGROUND AND SUMMARY OF THE INVENTION

The invention relates to an adjusting device for a disc brake and, in particular, an adjusting device for a pneumatically actuated disc brake having a rotary-lever-actuated brake application device, which adjusting device can preferably be inserted into an adjusting spindle of the brake application device. The adjusting device has a clutch ring for coupling to a spring sleeve which is in engagement with the adjusting spindle.

Adjusting devices or wear adjustors for disc brakes exist in various embodiments. DE 10 2004 037 771 A1 (having U.S. published counterpart application US2009/209890 A1) discloses an adjusting device for a disc brake, the specifications of which are expressly incorporated by reference herein. This adjusting device is suitable for a pneumatically actuated disc brake, in particular one of sliding-caliper design. Furthermore, the adjusting device can however also be used in pneumatically actuated fixed-caliper or pivoting-caliper disc brakes.

Pneumatically actuated disc brakes have over time become standard equipment on heavy commercial vehicles. Such disc brakes require mechanical boosting or "force amplification" in order to produce the demanded brake application force, because the force of the pneumatically charged brake cylinders is restricted on account of the pressure level (at present approximately 10 bar) and the limited structural size of the brake cylinder. Presently known pneumatically actuated disc brakes have boost ratios of between 10:1 and 20:1. The piston strokes of the brake cylinders are in the range from 50 mm to 75 mm, resulting in brake application travels of approximately 4 mm for pressing the brake pads against the brake disc.

The friction material thickness of the brake pads lies in the range of 20 mm, and because two pads are installed, this results in a wear travel of approximately 40 mm, not taking disc wear into consideration. This travel is a multiple greater than the above-mentioned brake application travel. It is therefore necessary for the brake to be adjusted correspondingly to the pad wear by means of a device. The prior art provides automatic wear adjustment by means of which the so-called air play, that is to say the gap between the brake pads and the brake disc in the non-actuated state, is kept constant independently of the wear state and wear behavior of the brake pads.

In commercial vehicles, use is very often made of disc brakes which have an adjuster which is arranged concentrically in the cavity of a threaded spindle and which is driven eccentrically by a rotary lever via a drive element (for example shift finger or toothed wheel). During a braking process, the rotary lever which is coupled to the piston rod of the brake cylinder performs a rotational movement. Before the rotational movement of the lever is introduced into the adjuster via the coupling mechanism of the adjusting means (for example shift fork and shift finger or toothed wheel), a so-called idle travel must be overcome. This travel is decisive of the size of the so-called air play, because during this movement, the adjustment is not activated, and the brake application travel therefore constitutes the air play. After the idle travel is overcome, the adjuster is set in a rotational movement, and an adjusting process is initiated by the coupling to the threaded spindle or tube.

DE 10 2004 037 711 A1 describes an adjuster of this type, which is shown in FIG. 12. The adjuster is composed substantially of the following functional elements: shaft 2; bearing disc 3; axial bearing 5; collar bush, or spacer sleeve 19; shift fork, or drive ring 6; ball ramp clutch 7; cone clutch 17; and cylindrical spring 12. With regard to the description, reference is made to DE 10 2004 037 711 A1.

The adjusting device must basically perform two functions:

1. the automatic air play adjustment; and
2. the manual restoration or retraction of the adjusting mechanism upon replacement of the brake pads.

When installing new brake pads, thrust pieces which press the pads against the brake disc must be reset. This is carried out by turning back or retracting threaded plungers (threaded tubes or adjusting spindles) which, during use of the brake, have been screwed out by the automatically operating adjusting device according to pad wear.

When turning back the adjusting spindles, it must be ensured that the spindles are not turned against a delimitation with too high a force. If this were to occur, there is the risk of the adjustment being inoperative after replacing the brake pads because the force with which the adjusting spindles are jammed against the delimitation is greater than the adjusting force generated by the adjuster.

As mentioned above, when installing new brake pads, the adjusting spindles are reset by manually turning the adjuster. Since it is not possible to visually check the end position of the adjusting spindles, a mechanical, clearly perceptible turn-back delimitation is required.

It is therefore the object of the present invention to provide an adjusting device with a turn-back delimitation, with the above disadvantages being eliminated or significantly reduced, and further advantages being obtained.

This and other objects are achieved by an adjusting device for adjusting for wear of the brake pads and the brake disc of a pneumatically actuated disc brake having a rotary-lever-actuated brake application device, which adjusting device can preferably be inserted into an adjusting spindle. The adjusting device has a clutch ring for coupling to a spring sleeve which is in engagement with the adjusting spindle. A blocking device is arranged between the adjusting device, which can be inserted into the adjusting spindle, and the adjusting spindle. The blocking device forms a stop in the tangential direction relative to the direction of rotation for the adjusting spindle. In this way, it is advantageously obtained that, during the resetting of the adjusting spindle by the adjusting device, the adjusting spindle is prevented by the blocking device from becoming jammed, because the stop in the tangential direction halts the rotational movement.

Since the turning back of the adjusting spindle is carried out by use of the adjusting device, and the adjuster or the adjusting device is in direct engagement with the adjusting spindle, the turn-back delimitation can be realized by way of the adjuster, such that no complex modifications are necessary.

When the adjusting spindle has reached the pad installation position, the adjuster is retracted into the adjusting spindle to a maximum extent. The adjusting spindle performs a rotational movement relative to the clutch ring of the adjuster. A deformable or displaceable profiled blocking element is arranged between the end side of the adjusting spindle and the adjuster. The clutch ring of the adjuster preferably has a corresponding, for example a sawtooth-like crown, toothing adapted to the blocking element.

If the adjusting spindle is now turned back, it comes into contact with the blocking element at the end of the adjustment path. The blocking element is deformed or displaced axially by the end side of the adjusting spindle until the profile engages in the toothing of the clutch ring. Since the clutch ring is fixed to the disc brake, for example to the brake caliper thereof, by means of a collar bush and a bearing disc of the adjuster, the adjusting spindle can be turned back no further. A turn-back stop which acts in the circumferential direction is thereby realized. Jamming of the adjusting spindle can thereby be prevented. When the brake is actuated, the adjusting spindle can be turned away from the stop by the adjuster without the need to overcome a high friction force or jamming force.

An alternative embodiment provides a crown toothing on the adjusting spindle. Here, when the pad installation position is reached, the adjusting spindle engages with the end-side toothing directly into the end-side toothing of the clutch ring on the adjuster. As a result, the adjusting spindle can be turned back no further. Since it is the case in this solution too that the stop acts in the tangential direction, no jamming occurs. It is therefore possible for the adjusting spindle to be turned away from the stop with little force expenditure. The automatic adjustment function is thereby ensured without restriction.

Axial mobility of the blocking element is made possible for example by means of at least one lug which engages with a recess of the spring sleeve. The blocking element may have resilient hooks which are provided to engage with corresponding recesses of the clutch ring.

A disc brake, in particular a pneumatically actuated disc brake, has the above-described adjusting device.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a partial section illustration of a first exemplary embodiment of an adjusting device according to the invention;

FIG. 3 is a perspective view of a first exemplary embodiment of a blocking element;

FIG. 6 is a partial section illustration of a third exemplary embodiment of an adjusting device according to the invention with a third exemplary embodiment of the blocking element;

FIG. 7 is a perspective view of the third exemplary embodiment of the blocking element;

DETAILED DESCRIPTION OF THE DRAWINGS

Figure 1:
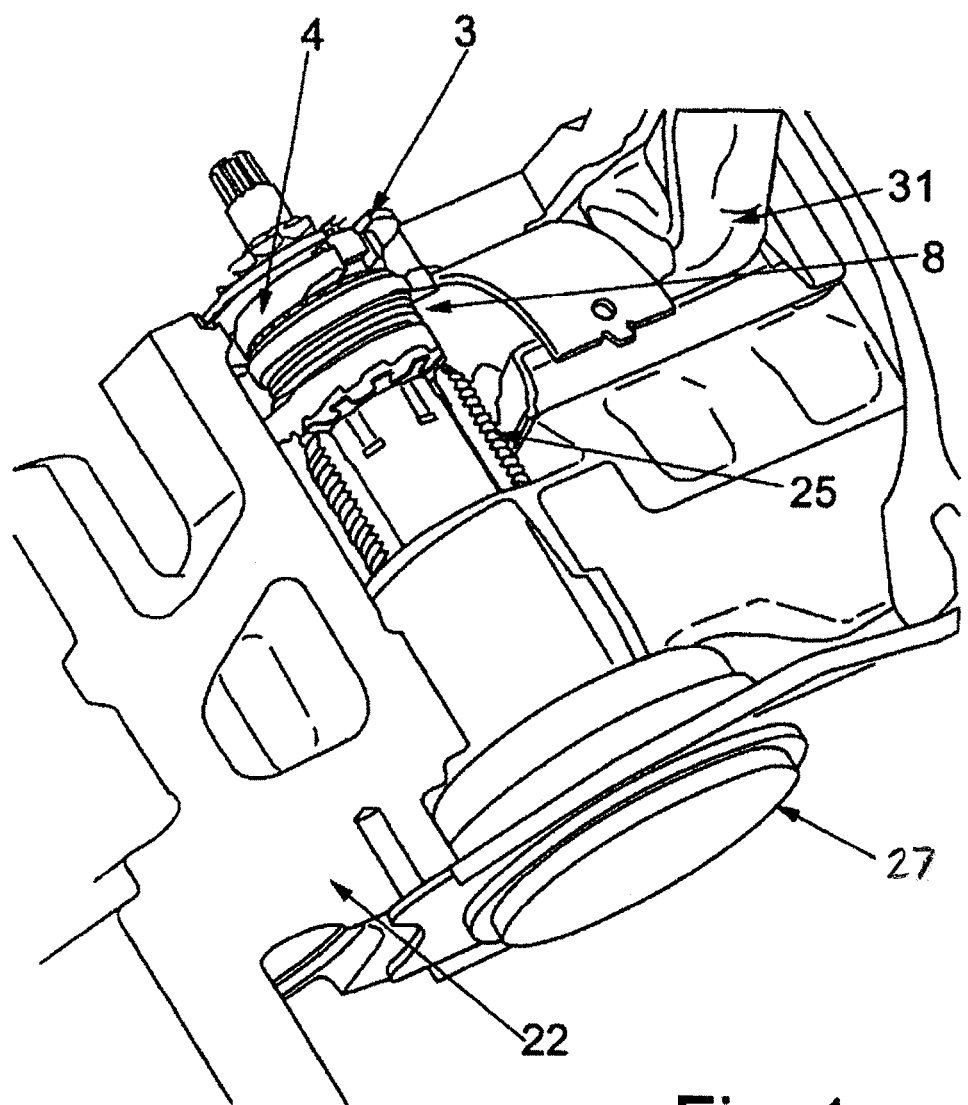
FIG. 1 is a partial section illustration of a brake caliper of a disc brake having an adjusting spindle and having an adjusting device.
Figure 4:
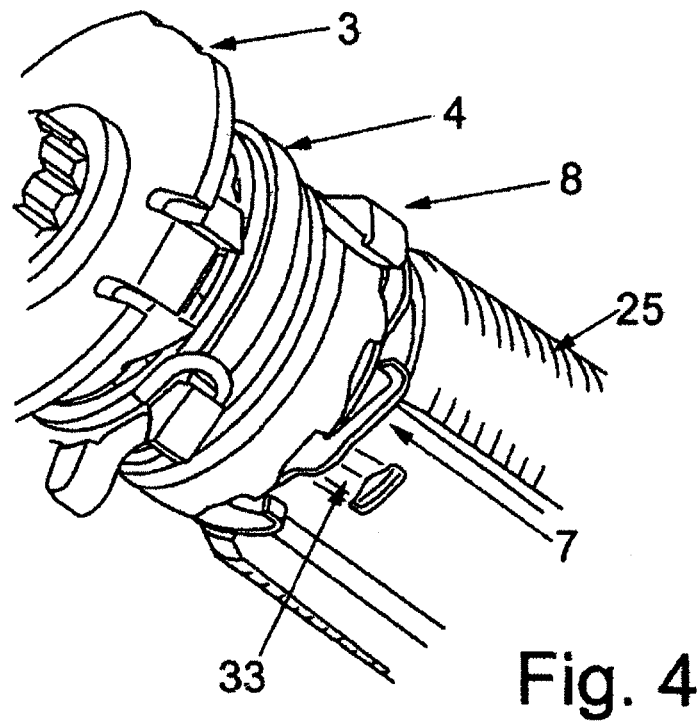
FIG. 4 is a partial section illustration of a second exemplary embodiment of an adjusting device according to the invention with a second exemplary embodiment of the blocking element.

Elements with the same or similar functions are provided with the same reference numerals in the figures.

Figure 13:
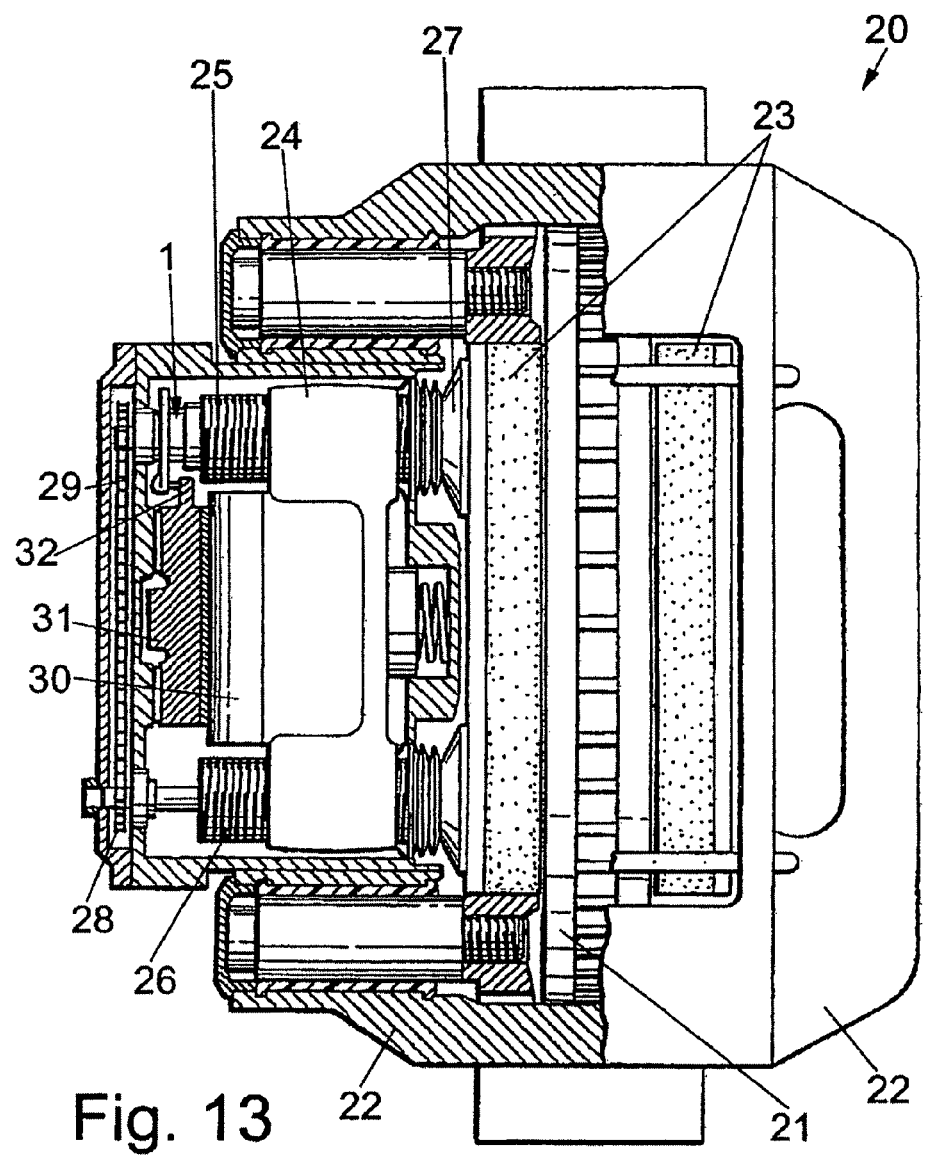
FIG. 13 is a schematic illustration of a disc brake.

With regard to the design and function of a pneumatic disc brake according to FIG. 13, reference is made to the corresponding description of DE 197 29 024 C1, the specification of which is expressly incorporated by reference herein. The following components are indicated in FIG. 13: disc brake 20, brake disc 21, brake caliper 22, brake pads 23, bridge 24, adjusting spindles 25 and 26, thrust pieces 27, sprockets 28, chain 29, eccentric 30 and rotary lever 31, which has a drive element 32 interacting with a shift fork of an adjusting device 1. The adjusting device 1 is in this case arranged in the adjusting spindle 25. An adjusting device 1 will now be explained in more detail. The adjusting device 1 would also be suitable for an electromotively actuated disc brake.

FIG. 1 shows a partial section illustration of a brake caliper 22 of a disc brake 20 having an adjusting spindle 25 and an adjusting device according to the invention, which is inserted in the adjusting spindle 25. The adjusting spindle 25 is provided at the bottom with a thrust piece 27 (see also FIG. 13), with the adjusting spindle being shown here in an initial position for installation or exchange of a brake pad.

The adjusting device 1 has the following components, which are not all shown here: a spindle, having a drive journal at its upper end; a bearing disc 3 for fastening the adjusting device 1 in the brake caliper 22; a collar bush 4 which is rotationally fixedly coupled to the bearing disc 3 and has an upper collar with a running surface arranged therebelow for balls of an axial bearing; a drive ring which is connected to a shift fork which is coupled to a rotary lever 31; a ball ramp clutch having a clutch ring 8 which interacts with a spring sleeve 14; and a cylindrical spring which is arranged in the spring sleeve 14 and which is supported on a profiled disc. The general function of the adjusting device 1 is described in detail in DE 10 2004 037 771 A1 with regard to FIG. 5, to which reference is hereby made.

Reference is now made to FIGS. 2, 4, 6 and 8, in which are respectively shown, in partial section illustration, a first, second, third and fourth exemplary embodiment of an adjusting device 1 according to the invention with a first, second, third and fourth exemplary embodiment of a blocking element 5 according to the invention.

A blocking device is arranged between the underside of the clutch ring 8 and the top side of the adjusting spindle 25. In these present examples, the blocking device has in each case one deformable or displaceable profiled blocking element 5.

The clutch ring 8 of the adjuster 1 preferably has a sawtooth-like crown toothing adapted to the blocking element 5. If the adjusting spindle 25 is now turned back, it comes into contact with the blocking element 5 at the end of the adjustment path. The blocking element 5 is deformed or displaced axially by the end side of the adjusting spindle 25 until the end profile engages in the toothing of the clutch ring 8. Since the clutch ring 8 is fixed by means of the collar bush and the bearing disc 3 of the adjuster 1, the adjusting spindle 25 can be turned back no further. A turn-back stop which acts in the circumferential direction is thereby realized. Jamming of the adjusting spindle 25 can thereby be prevented. When the brake is actuated, the adjusting spindle 25 can be turned away from the stop by the adjuster 1 without the need to overcome a high friction force or jamming force.

The respective blocking elements 5 are illustrated in FIGS. 3, 5, 7 and 9 as first, second, third and fourth exemplary embodiments.

The different blocking elements 5 have in each case lugs 6 situated on an inner periphery for rotationally fixed connection to recesses 33, which run in the axial direction, of the spring sleeve 14. In this way, the blocking elements 5 are in each case axially displaceable along the spring sleeve 14.

The blocking element 5, according to the first exemplary embodiment in FIG. 3 has, on its outer circumference, resilient hooks 7 that engage with corresponding recesses of the clutch ring 8.

Figure 5:
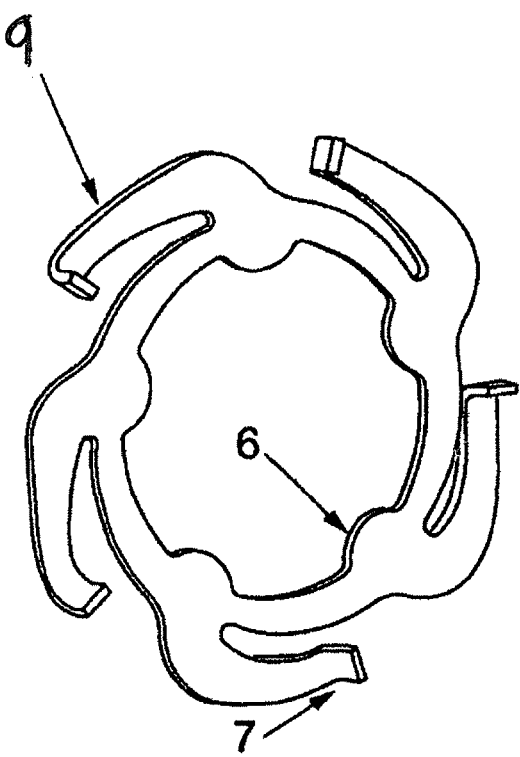
FIG. 5 is a perspective view of the second exemplary embodiment of the blocking element.
Figure 8:
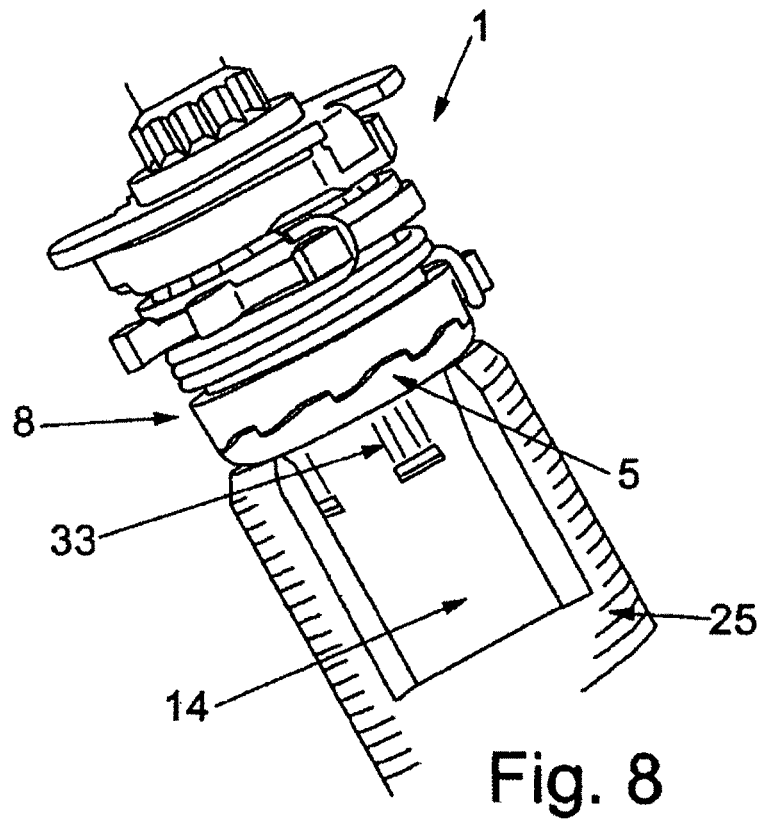
FIG. 8 is a partial section illustration of a fourth exemplary embodiment of an adjusting device according to the invention with a fourth exemplary embodiment of the blocking element.

FIG. 5 shows an alternative in a second embodiment of the blocking element 5, with the hooks 7 being attached in each case to spring lugs 9.

FIG. 7 illustrates a further alternative in a third embodiment of the blocking element 5. Here, there are teeth of a toothed profile 10 on the outer circumference, and restoring spring elements 11 situated at the inside for interaction with the adjusting spindle 25.

Figure 9:
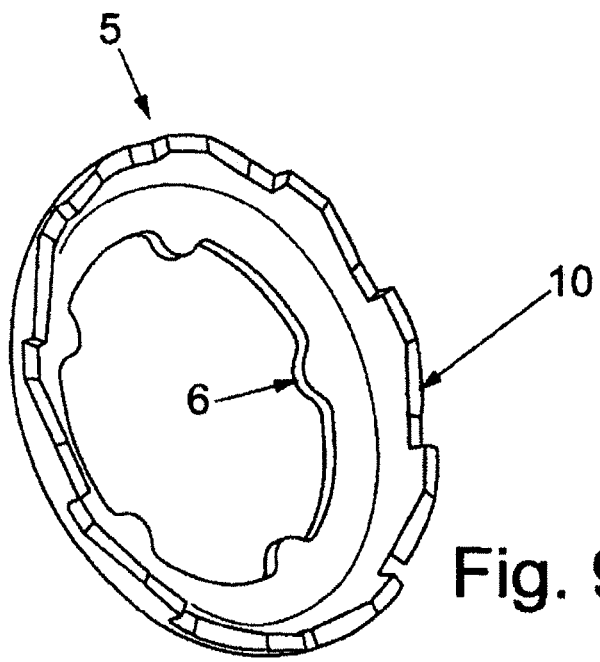
FIG. 9 is a perspective view of the fourth exemplary embodiment of the blocking element.

FIG. 9 shows yet a further alternative in a fourth embodiment of the blocking element 5. Here, teeth of the toothed profile 10 are arranged on the outer circumference. The blocking element 5 is, for example, a rigid ring.

Figure 10:
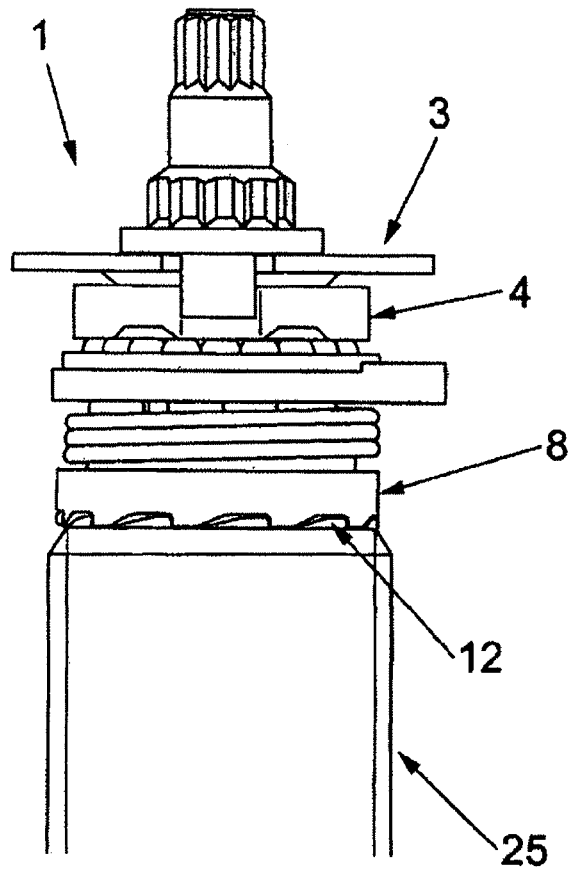
FIG. 10 is a partial view of a fifth exemplary embodiment of an adjusting device according to the invention.
Figure 11:
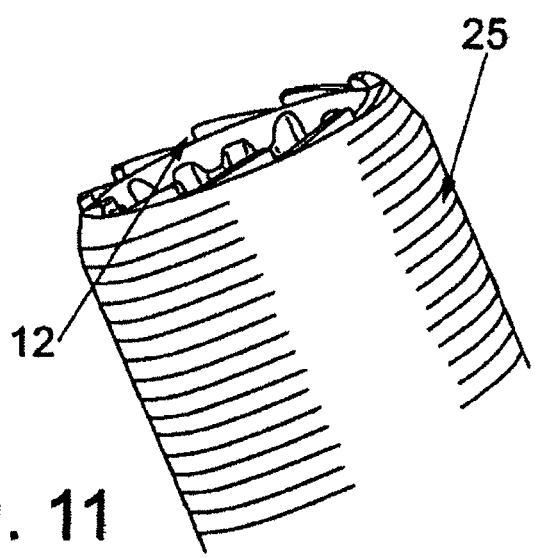
FIG. 11 is a perspective view of an adjusting spindle with a toothing.
Figure 12:
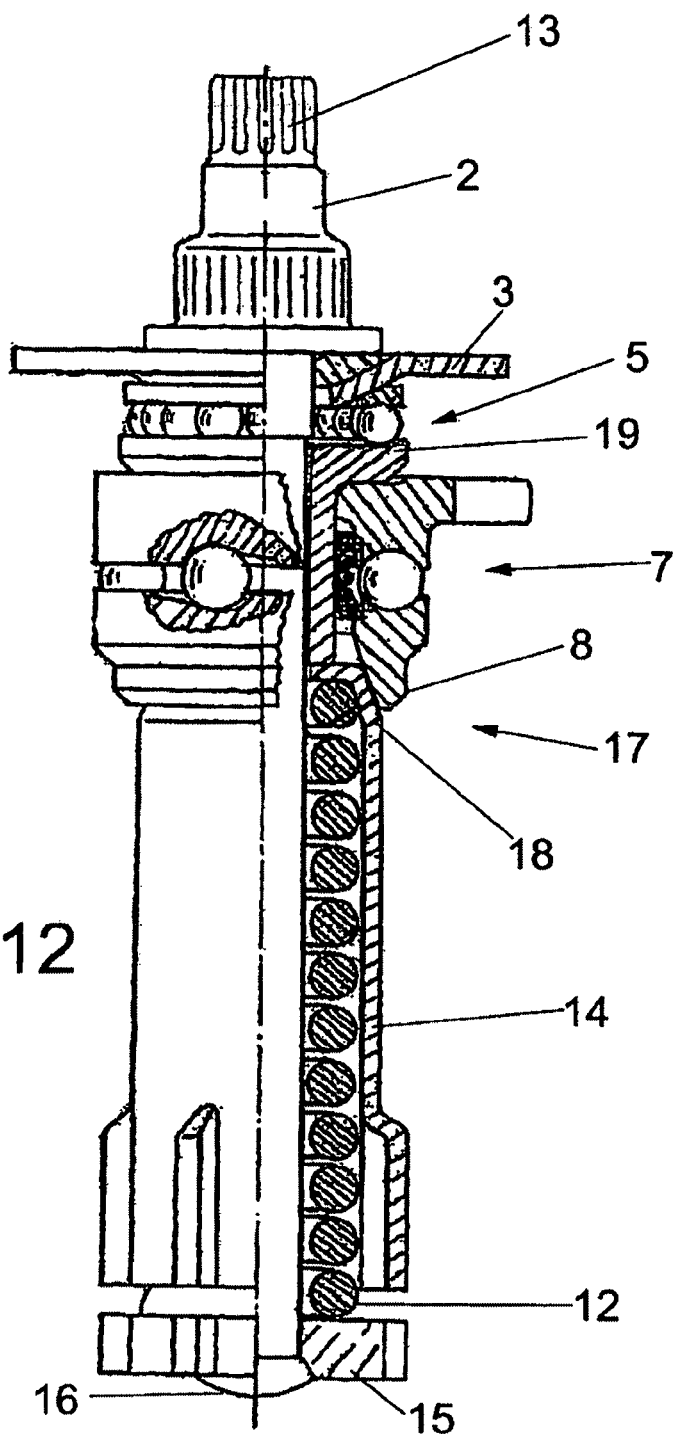
FIG. 12 is a partial section illustration of an adjusting device according to the prior art.

A further possible solution is for a crown toothing to be formed on the adjusting spindle 25, and this is shown, as a fifth exemplary embodiment, in FIGS. 10 and 11. In this solution, when the brake pad installation position is reached, the adjusting spindle 25 engages, with an end-side toothing 12 integrally formed thereon, directly into a corresponding end-side toothing of the clutch ring 8 on the adjuster 1. As a result, the adjusting spindle can be turned back no further. Since it is the case in this solution too that the stop acts in the tangential direction, no jamming occurs, and it is therefore possible for the adjusting spindle 25 to be turned away from the stop with little force expenditure. The automatic adjustment function is thereby ensured without restriction.

TABLE OF REFERENCE NUMERALS

1 Adjusting device (wear adjustor)
2 Shaft
3 Bearing disc
4 Collar bush
5 Blocking element
6 Lug
7 Hook
8 Clutch ring
9 Spring lug
10 Toothed profile
11 Restoring spring element
12 Toothing
13 Drive journal
14 Spring sleeve
15 Profiled disc
16 Adjusting element
17 Cone clutch
18 Sleeve cone
19 Spacer sleeve
20 Disc brake
21 Brake disc
22 Brake caliper
23 Brake pads
24 Bridge
25 First adjusting spindle
26 Second adjusting spindle
27 Thrust piece
28 Sprockets
29 Chain
30 Eccentric
31 Rotary lever
32 Drive element
33 Recess The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wear adjustor for adjusting for wear of brake pads and a brake disc of a pneumatic disc brake having a rotary-lever-actuated brake application device, with an adjusting spindle configured to receive the wear adjustor, the wear adjustor comprising:
    a spring sleeve operatively configured for engagement with the adjusting spindle;
    a clutch ring for coupling to the spring sleeve;
    a blocking device operatively arrangeable between the adjusting spindle and the wear adjustor, the blocking device forming a stop in the tangential direction relative to a rotational direction of the adjusting spindle.

2. The wear adjustor according to claim 1, wherein the blocking device is arranged between the clutch ring and the adjusting spindle.

3. The wear adjustor according to claim 1, wherein the blocking device comprises a toothing integrally formed on an end of the adjusting spindle facing toward the clutch ring, said toothing engaging in corresponding toothing integrally formed on the clutch ring.

4. The wear adjustor according to claim 2, wherein the blocking device comprises a toothing integrally formed on an end of the adjusting spindle facing toward the clutch ring, said toothing engaging in corresponding toothing integrally formed on the clutch ring.

5. The wear adjustor according to claim 2, wherein the blocking element is attached in a rotationally fixed manner to the spring sleeve, the blocking element engaging with corresponding recesses of the clutch ring.

6. The wear adjustor according to claim 5, wherein the blocking element is axially displaceable relative to the spring sleeve.

7. The wear adjustor according to claim 5, wherein the blocking element is axially deformable relative to the spring sleeve.

8. The wear adjustor according to claim 5, wherein the blocking element comprises resilient hooks operatively configured to engage with the corresponding recesses of the clutch ring.

9. The wear adjustor according to claim 5, wherein the blocking element comprises a toothed profile having at least one tooth operatively configured to engage with the corresponding recesses of the clutch ring, the blocking element further comprising at least one restoring spring element.

10. The wear adjustor device according to claim 5, wherein the blocking element further comprises at least one lug operatively configured to rotationally fix the blocking element relative to the spring sleeve, said lug providing engagement with a recess of the spring sleeve.

11. The wear adjustor device according to claim 8, wherein the blocking element further comprises at least one lug operatively configured to rotationally fix the blocking element relative to the spring sleeve, said lug providing engagement with a recess of the spring sleeve.

12. The wear adjustor device according to claim 9, wherein the blocking element further comprises at least one lug operatively configured to rotationally fix the blocking element relative to the spring sleeve, said lug providing engagement with a recess of the spring sleeve.

13. A pneumatic disc brake, comprising:
   a wear adjustor for adjusting for wear of brake pads and a brake disc of the disc brake;
   a rotary-lever brake application device arranged in a caliper of the disc brake, the brake application device comprising an adjusting spindle in which the wear adjustor is operatively arranged;
   wherein the wear adjustor comprises a clutch ring for coupling to a spring sleeve which is engagement with the adjusting spindle; and
   a blocking device arranged between the adjusting spindle and the wear adjustor, said blocking device forming a stop in a tangential direction relative to a rotational direction of the adjusting spindle.

14. The disc brake according to claim 13, wherein the blocking device is arranged between the clutch ring and the adjusting spindle.

15. The disc brake according to claim 13, wherein the blocking device comprises a toothing integrally formed on an end of the adjusting spindle facing toward the clutch ring, said toothing engaging in corresponding toothing integrally formed on the clutch ring.

16. The disc brake according to claim 14, wherein the blocking element is attached in a rotationally fixed manner to the spring sleeve, the blocking element engaging with corresponding recesses of the clutch ring.

17. The disc brake according to claim 16, wherein the blocking element comprises resilient hooks operatively configured to engage with the corresponding recesses of the clutch ring.

18. The disc brake according to claim 16, wherein the blocking element comprises a toothed profile having at least one tooth operatively configured to engage with the corresponding recesses of the clutch ring, the blocking element further comprising at least one restoring spring element.

19. The disc brake device according to claim 16, wherein the blocking element further comprises at least one lug operatively configured to rotationally fix the blocking element relative to the spring sleeve, said lug providing engagement with a recess of the spring sleeve.

* * * * *